United States Patent [19]

Gauthier

[11] Patent Number: 4,880,945
[45] Date of Patent: Nov. 14, 1989

[54] ELECTRIC SWITCH FOR CONTROLLING CHANGE-OF-DIRECTION INDICATORS ON A MOTOR VEHICLE

[75] Inventor: Christian Gauthier, Paris, France

[73] Assignee: Jaeger, Levallois Perret, France

[21] Appl. No.: 191,267

[22] Filed: May 6, 1988

[30] Foreign Application Priority Data

May 7, 1987 [FR] France ................................ 87 06496

[51] Int. Cl.$^4$ ............................................... H01H 3/18
[52] U.S. Cl. ................................ 200/61.54; 200/61.27
[58] Field of Search ................ 200/61.54, 61.27, 61.34

[56] References Cited

U.S. PATENT DOCUMENTS 4,739,131  4/1988  Maeda ............................... 200/61.27

FOREIGN PATENT DOCUMENTS

| 1037886 | 8/1958 | Fed. Rep. of Germany . |
| 2201157 | 7/1973 | Fed. Rep. of Germany . |
| 2515754 | 10/1976 | Fed. Rep. of Germany . |
| 2528681 | 1/1977 | Fed. Rep. of Germany . |
| 2191235 | 2/1974 | France . |
| 2199708 | 4/1974 | France . |
| 2246171 | 4/1975 | France . |
| 2297750 | 8/1976 | France . |
| 2326310 | 4/1977 | France . |

Primary Examiner—A. D. Pellinen
Assistant Examiner—Morris Ginsburg

[57] ABSTRACT

An electric switch cooperating with a steering wheel shaft provided with a control cam for controlling change of direction indicators of a motor vehicle includes a support casing and a control lever pivotally mounted on the support casing about a first pivot axis and a reversing plate pivotally mounted on the support about a second axis parallel to the first pivot axis. The lever includes an indexing stud which cooperates with a notched surface on the support casing. The reversing plate is resiliently urged toward the steering wheel shaft and faces the control cam to move relative to the second axis away from the control cam. Drive structures are provided on the reversing plate for cooperation with the lever so that the reversing plate is pivoted about the second axis into a working position when the control lever is itself pivoted about the first axis into a working position. Slopes provided on the reversing plate interfere with the rotary path of the control cam when the reversing plate is in the working position.

16 Claims, 5 Drawing Sheets

FIG_1

FIG_2

FIG-3

FIG_4

ELECTRIC SWITCH FOR CONTROLLING CHANGE-OF-DIRECTION INDICATORS ON A MOTOR VEHICLE

The present invention relates to electric switches for controlling change-of-direction indicators on motor vehicles.

The aim of the present invention is to improve the control means which are integrated in such switches for the purpose of automatically returning them to the rest position whenever the steering wheel is rotated in the appropriate return direction.

BACKGROUND OF THE INVENTION

Numerous control means have already been proposed for automatically returning the switches designed for controlling change-of-direction indicators to the rest position.

In most cases, these control means comprise a control lever pivotally mounted on a support together with a controlling cam fixed to the steering wheel shaft, i.e. to the shaft connected to the steering wheel and used for swivelling the steerable wheels.

A first prior embodiment of such control means is shown in French patent specification FR-A-2 515 865 or in French patent application number FR-86 16924 filed 3rd December 1986 by the present Assignee. In this first embodiment, the control means comprise a contact-carrying equipment associated with an indexing system, a return finger, two symmetrical traction springs, a forcing slide, and a forcing spring. The contact-carrying equipment is provided with a cut-out delimited by a W-shaped border. The forcing slide is provided with an oblong slot which is radial relative to the axis of the steering wheel shaft. The return finger carries two opposite stub axles engaged respectively in the cut-out and in the slot. The traction springs urge the return finger towards the control cam. However, in the rest position, when none of the change-of-direction indicators is switched on, one of the stub axles rests against the middle point of the W-shaped cut-out, and the finger is at a distance from the control cam. In a working position, while the contact-carrying equipment is pivoted and one of the change-of-direction indicators is switched on, the stub axles are displaced radially in the cut-out and in the slot, moving closer towards the shaft. The finger enters into the displacement sector of the control cam. For one direction of shaft rotation, the control cam causes the finger to pivot about the axis of the stub axles without acting on the contact-carrying equipment. For the opposite direction of rotation, the control cam drives the finger to return the contact-carrying equipment to the rest position. The forcing spring and slide prevent the device from being damaged if the driver holds the switch in the working position while the steering wheel shaft is rotating in such a direction as to tend to return the switch to the rest position. These control means have already provided good service. However, they comprise a relatively large number of parts.

A second known way of implementing such control means is shown in U.S. Pat. No. 4 393 280. In this second embodiment, the control means comprise a contact-carrying equipment which surrounds the steering wheel shaft, a cam carried by the equipment opposite to the control lever about the steering wheel shaft and serving to co-operate with the control cam, and a spring interposed between the cam and the contact-carrying equipment. These control means have also provided good service. However, since the contact-carrying equipment surrounds the steering wheel shaft, the switch must be installed axially with the steering wheel removed.

A third prior implementation of such control means is shown in French patent specification FR-A-2 076 682. In this third embodiment, the control means comprise at least one wheel suitable for rolling with friction against the steering wheel shaft, a gear wheel fixed to the rolling wheel, a toothed sector suitable for engaging the gear wheel when the associated control lever is pivoted, and a spring engaged with the toothed sector. These control means have also provided good service. However, they comprise a relatively large number of parts. Further, in operation, they depend to a large extent on the magnitude of the friction force exerted by the rolling wheel on the steering wheel shaft. In practice, it is observed that this force tends to reduce considerably in use.

A fourth prior implementation of the control means is shown in U.S. Pat. No. 4 315 117. In this fourth embodiment, the control means comprise a circular equipment rotably mounted on a support plate and provided with two peripheral concave index notches, a locking yoke resting against the equipment, a lever pivotally mounted on the yoke, and a traction spring interposed between the yoke and the lever. When the equipment is moved to the working position to switch on one of the change-of-direction indicators, the locking yoke penetrates into one of the concave index notches. The equipment is returned to the rest position when the steering wheel shaft is rotated in an appropriate direction and the control cam displaces the lever in a direction tending to urge the yoke out from the above-mentioned concave notch. These control means have also provided good service. However, they are constituted by a relatively large number of parts.

A fifth prior implementation of such control means is shown in German patent specification No. 3 430 664. In this fifth embodiment, the control means comprise an equipment associated with the control lever and pivotally mounted on a support plate, a cam which is pivotally mounted on the equipment and which co-operates with the control cam, and a spring interposed between the cam and the equipment in order to urge the cam towards a rest position relative to the control cam. These control means have already provided good service. However, they require structures of relatively complex parts, in particular with respect to the pivoting equipment which in turn supports the pivoting cam.

SUMMARY OF THE INVENTION

The object of the present invention is to improve the situation by proposing novel means for providing automatic return to the rest position of electrical switches for controlling change-of-direction indicators in a motor vehicle, said means being simpler than previously proposed dispositions, in particular requiring fewer parts, and because of this, inter alia, being more reliable and cheaper.

An auxiliary object of the present invention, which is known per se, is to provide control means suitable firstly for automatically returning the switch to the rest position when the steering wheel shaft is rotated in an appropriate direction, and secondly to avoid damage to the system should the vehicle driver manually hold the switch in the working position while rotation of the steering wheel shaft is tending to return the switch to the rest position.

Another object of the present invention is to provide control means suitable for being installed on one side of the steering column without requiring the steering wheel to be dismantled.

These various objects are achieved, according to the present invention, by an electric switch for controlling the change-of-direction indicators of a motor vehicle, and including control means suitable for ensuring that the switch returns automatically to a rest position, the switch being of the type including a control lever pivotally mounted on a support and a control cam fixed to the steering wheel shaft, said control means comprising a reversing plate pivotally mounted on the support about an axis different from the pivot axis of the lever and facing the control cam, the reversing plate being provided with drive structures suitable for co-operating with the lever in such a manner that the reversing plate is pivoted about its axis into a working position when the control lever is itself pivoted into a working position, together with a component provided with slopes and carried by the reversing plate in such a manner that the slopes interfere with the rotary path of the control cam when the reversing plate is in the working position, the component having ramps being, in addition, suitable for moving radially relative to the pivot axis of the reversing plate away from the control cam against the resilient force exerted by a spring associated with the reversing plate, thereby enabling it to escape from the control cam.

BRIEF DESCRIPTION OF THE DRAWINGS

Embodiments of the invention are described by way of example with reference to the accompanying drawings, in which:

FIG. 1 is a diagram of control means integrated with the electric switch in accordance with the present invention, shown in the rest position, i.e. when neither of the change-of-direction indicators is switched on;

FIG. 2 is a similar diagram showing the control means moved to a working position, i.e. when one of the change-of-direction indicators is switched on, more precisely, FIG. 2 shows the co-operation between the control means and the control cam mounted on the steering wheel shaft;

DETAILED DESCRIPTION

The accompanying figures show a control lever 10, a steering wheel shaft 30 carrying a control cam 32, and control means 50 placed between the lever 10 and the control cam 32 in order to return the switch to the rest position automatically.

Numerous electrical switches for controlling the change-of-direction indicators of a motor vehicle have already been proposed. The general structure of such switches lies outside the scope of the present invention. That is why the structure of the electric switch is not shown in the accompanying figures and is not described in greater detail below.

The control means shown in the accompanying figures and described below may be fitted, by way of example, to electric switches as defined in French patents FR-A-2 515 865 and FR-A-2 517 111 in the name of the Assignee, or as defined in French patent applications filed by the Assignee on April 18, 1986 under the number 86 05604, June 3, 1986 under the number 86 07963, December 3, 1986 under the number 86 16924, and December 3, 1986 under the number 86 16925. However the present invention should not be limited to the switches defined in the above-specified documents. It extends to any type of electric switch for controlling the change-of-direction indicators of a motor vehicle.

Naturally, the control lever 10 is associated with contact-carrier equipment suitable for providing the necessary switching to control the change-of-direction indicators. As mentioned above, this contact-carrier equipment is not shown in the accompanying figures in order to simplify them.

However, it will be observed, as shown in the figures, that the control lever 10 is pivotally guided about an axis 12 on a support having overall reference 1. The axis 12 extends transversely to the long direction of the lever 10. It also extends transversely to the planes of accompanying FIGS. 1 to 4.

The control lever 10 and/or the associated contact-carrier equipment is indexed while it is being pivoted about the axis 12. This may be done in conventional manner by the control lever 10 and/or the associated contact-carrier equipment being provided with an indexing stud which is resiliently urged against a notched surface which is shown diagrammatically under reference 20 in accompanying FIG. 1. The structure of such indexing means which are conventional per se is not described in greater detail herein.

Figure 1:
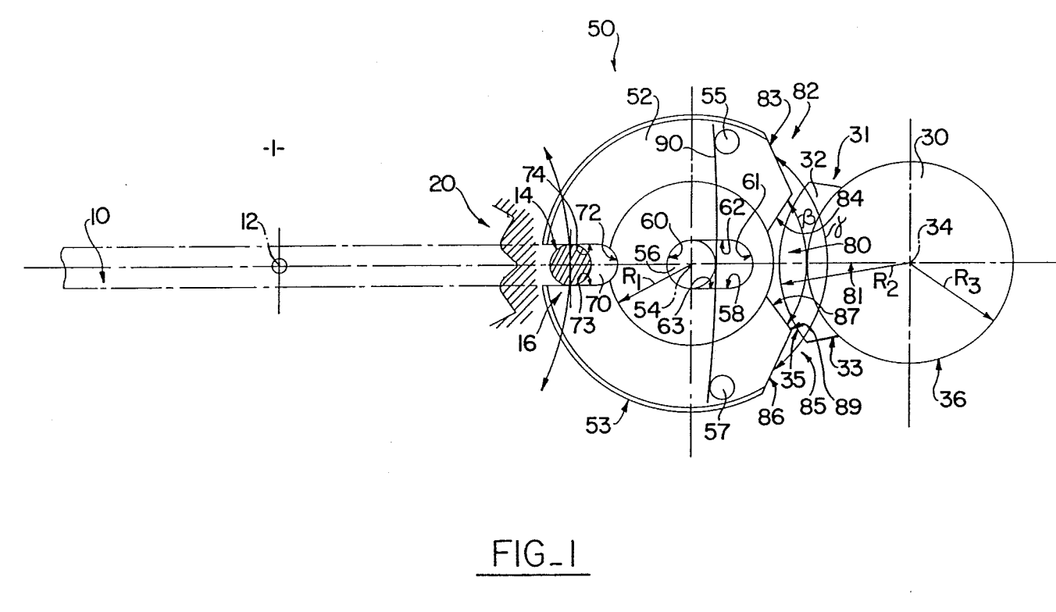

In FIG. 1, the control lever 10 is shown in its rest position in which none of the change-of-direction indicators is switched on. However, in FIGS. 2 and 3, the control lever 10 is shown in a working position. In this working position, one of the change-of-direction indicators is switched on. It will be observed that this working position is obtained by pivoting the control lever 10 about the axis 12 through an angle α from its rest position.

Figure 2:
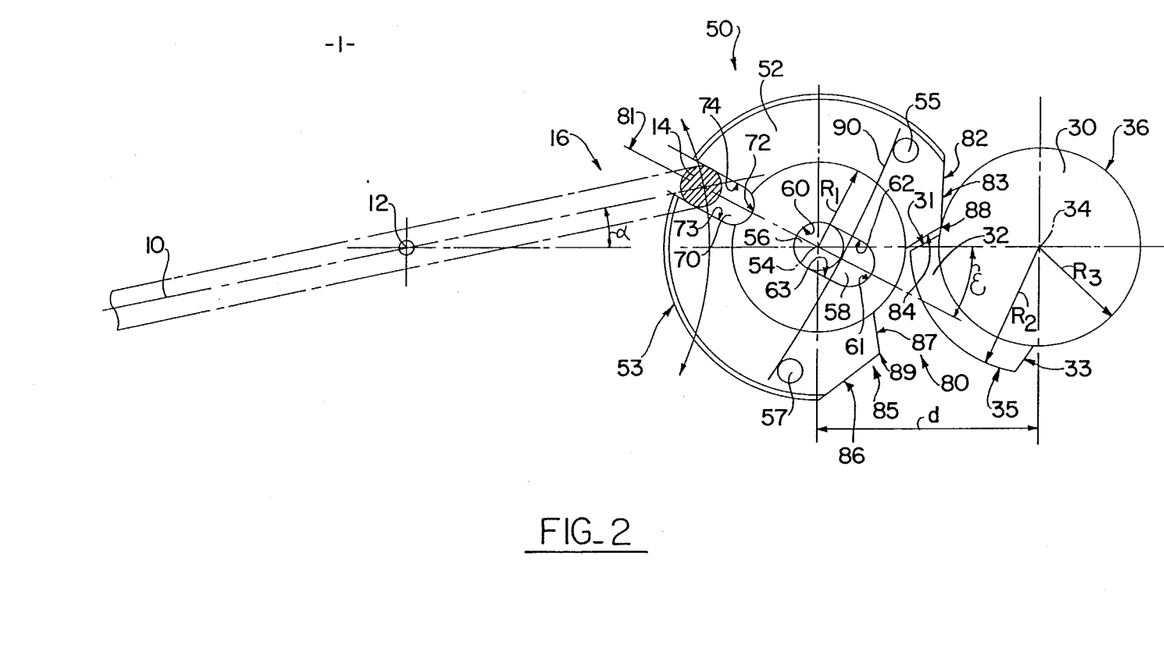
Figure 3:
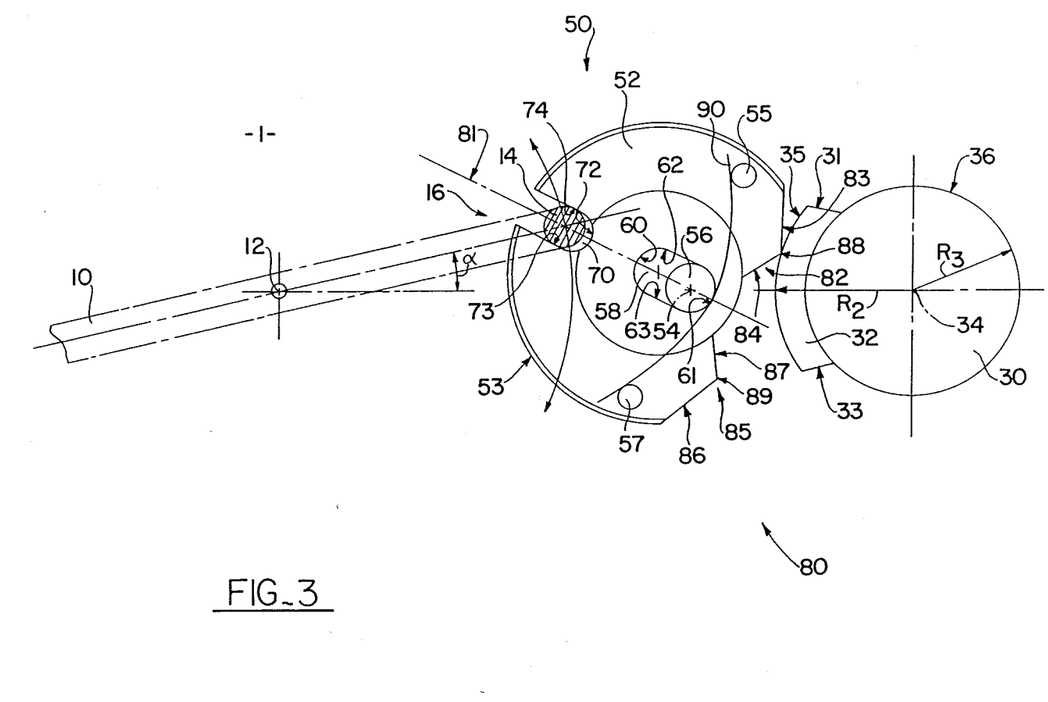
FIG. 3 is a similar view of the control means in the "forcing" position, i.e. in a position which is obtained when the driver holds the control lever in the working position so as to keep one of the change-of-direction indicators switched on in spite of the control cam on the steering wheel shaft tending to return the switch to the rest position.

Naturally, there is a second working position which is symmetrical about the rest position to the position shown in FIGS. 2 and 3, and this second position serves to switch on indicators for the opposite change of direction.

The steering wheel shaft 30 shown diagrammatically in the accompanying figures is rotated about an axis 34 which, in the accompanying drawings, is parallel in the accompanying drawings to the axis 12. The generally cylindrical peripheral surface of the steering wheel shaft 30 is referenced 36. The control cam 32 is in the form of a sector of a ring centered on the axis 34 and extending radially away from the steering wheel shaft 30 so as to project from the periphery 36 thereof. The radius of the control cam 32 is referenced $R_2$, and the radius of the steering wheel shaft 30 is referenced $R_3$. In the accompanying drawings, the angular extent of the control cam 30 about the axis 34 is about 80°.

In the accompanying figures, the periphery of the control cam 32 centered on the axis 34 is referenced 35.

The flanks of the control cam 32 are referenced 31 and 33.

The control means 50 interposed between the control lever 10 and the control cam 32 are essentially constituted by a reversing plate 52 and a spring 90.

In the accompanying figures, the reversing plate 52 is substantially in the form of a disk. It is rotatably mounted on the support 1 about an axis 54. In the present example, the axis 54 is embodied by a stub axle 56 fixed to the support 1. As shown in the accompanying drawings, the axis 54 is parallel to the above-mentioned axes 12 and 34. The axis 54 is situated between the above-mentioned axes 12 and 34. In addition, to being parallel the axes 12, 54, and 34 are coplanar.

The reversing plate 52 has a plane of symmetry referenced 81. This plane of symmetry 81 coincides with the plane containing the axes 12, 54, and 34 when in the rest position.

The stub axle 56 is engaged in an oblong slot 58 provided in the reversing plate 52. The slot 58 begins at the center of the plate 52 and extends radially from the center thereof going away from the lever 10. The slot 58 is suitable for guiding the reversing plate 52 to rotate about the axis 54 (which coincides, in normal operation, with the center of the reversing plate), while simultaneously allowing the plate 52 to move radially relative to the axis 54. To do this, the slot 58 is delimited by two opposite semi-cylindrical concave end surfaces 60 and 61 which are interconnected by two parallel planes 62 and 63. The semi-cylindrical end surfaces 60 and 61 have a radius of curvature which is complementary to that of the stub axle 56. The semi-cylindrical end surface 60 is centered on the center of the plate 52. Further, the distance between the plane surfaces 62 and 63 is complementary to the diameter of the stub axle 56. The plane surfaces 62 and 63 are parallel to the plane of symmetry 81.

Further, the reversing plate 52 is provided with drive structures suitable for co-operating with the control lever 10 in such a manner that the plate 52 is pivoted about the axis 54 in one or other of the working positions when the control lever 10 is itself pivoted into a working position.

In the accompanying drawings, the above-mentioned drive structures comprise firstly an oblong cut-out 70 provided in the reversing plate 52, and secondly a drive stud 14 fixed to the end 16 of the control lever 10 which is closest to the plate 52. The control stud 14 is in the form of a cylindrical rod extending parallel to the pivot axis 12. The cut-out, 70 opens out into the periphery 53 of the reversing plate. It is delimited by a concave semi-cylindrical end surface 72 which is extended towards the periphery 53 of the reversing plate 52 by two parallel plane surfaces 73 and 74. The surfaces 73 and 74 are parallel to the plane of symmetry 81.

The radius of curvature of the semi-cylindrical end surface 72 is complementary to that of the drive stud 14. Further, the distance between the plane surfaces 73 and 74 is complementary to the diameter of the stud 14. Thus, the stud may be engaged in the cut-out 70 and move freely radially therein relative to the center of the reversing plate 52.

The person skilled in the art will readily understand that the connection defined in this way between the control lever 10 and the reversing plate 52 ensures that the reversing plate 52 is displaced in the opposite direction to displacement of the control lever 10.

In other words, when the control lever 10 is pivoted about the axis 12 in an anti-clockwise direction, then the reversing plate 52 is, in contrast, pivoted about the axis 54 in a clock-wise direction, and vice versa.

The reversing plate 52 is also provided with slopes 80 suitable for co-operating with the control cam 32. The slopes 80 are provided in the periphery 53 of the reversing plate 52. They are disposed symmetrically about the plane of symmetry 81 passing through the center of the plate 52 which plane of symmetry coincides, in the rest position with the plane containing the axes 12, 54, and 34. The slopes 80 are provided on a ring whose inside diameter is referenced $R_1$.

More precisely, the system of slopes 80 comprises, in this case, two groups of slopes 82 and 85 which are symmetrically disposed relative to the plane 81.

Each of the groups of slopes 82 and 85 comprises a pair of slopes 83 and 84 or 86 and 87 as the case may be. These slopes 83, 84, 86, and 87 are delimited by lines extending parallel to the axis 54.

The symmetrical surfaces 84 and 87 which are closest to the plane of symmetry 81 together define a reentrant angle, i.e. an acute angle which is referenced $\beta$ in the accompanying figures. The surfaces 84 and 87 are referred to as "main" surfaces below.

In contrast, the symmetrical surfaces 83 and 86 which are furthest from the plane of symmetry 81 together define a projecting or obtuse angle which is referenced $\gamma$. The surfaces 83 and 86 are referred to below as "secondary" surfaces.

The distance between the axes 54 and 34, the inside radius $R_1$ of the slopes 80, and the angles of the slopes 80 relative to the center of the reversing plate are all determined in such a manner that in the rest position, i.e. when the plane of symmetry 81 is coplanar with the axes 54 and 34, the slopes 80 do not interfere with the region covered by the control cam 32 during rotation of the steering wheel shaft 30 about its axis 34 (see FIG. 1).

However, when the reversing plate 52 is moved by the control lever 10 into one or other of its two working positions, as shown in FIG. 2, one of the two groups of slopes 82 or 85 of the slopes 80 penetrates into the region in which the control cam 32 moves, thereby making it possible to co-operate therewith. For this purpose, the slope-forming surfaces 83, 84, 85, and 86 are disposed relative to the reversing plate 52 on the outside of a central region of radius $R_1$, in such a manner that the sum of the radius $R_1$ plus the radius $R_2$ of the periphery of the control cam 32 is substantially equal to the distance d between the axes 54 and 34, while leaving a small amount of clearance.

The point where the main surface 84 meets the secondary surface 83 is referenced 88. The point where the main surface 87 meets the secondary surface 86 is referenced 89.

The main surfaces 84 and 87 are oriented substantially along a bisector of the angle formed by a radius running from the center of the reversing plate 52 to a respective one of the points 88 and 89, and a normal to the plane of symmetry 81 (i.e. a normal to the direction in which the slot 58 and the cut-out 70 extend).

The secondary surfaces 83 and 86 should be oriented substantially transversely to the plane of symmetry 81. However, the orientation of the secondary surfaces 83 and 84 must be determined in association with their radial extent so that when the reversing plate 52 is in a working position, the control cam 32 never rests against the circular periphery of the reversing plate, but may bear against one or other of the above-mentioned secondary surfaces 83 and 86.

The above-mentioned spring 90 is suitable for urging the reversing plate 52 towards a position in which the center of the reversing plate 52 coincides with its pivot axis 54 as shown in FIG. 1. However, the spring 90 allows the reversing plate 52 to move radially relative to the axis 54 with the stub axle 56 moving along the slot 58.

The spring 90 may be constituted by a spring interposed between the drive stud 14 and the bottom end 72 of the cut-out 70.

However, in the accompanying drawings, the spring 90 is constituted by a blade interposed between the stub axle 56 and two pegs 55 and 57 which are fixed to the reversing plate 52.

The two pegs 55 and 57 are symmetrically disposed about the above-mentioned plane of symmetry 81. The spring-forming blade 90 extends substantially transversely to said plane of symmetry 81. The spring-forming blade 90 and the two pegs 55 and 57 are placed on the opposite side of the center of the reversing plate 52 to the side occupied by the cut-out 70.

The above-described control means operate as follows.

In the rest position, as shown in accompanying FIG. 1, the plane of symmetry 81 of the reversing plate 52 coincides with the plane containing the axes 12, 54, and 34 and with the center of the drive stud 14. The spring-forming blade 90 urges the reversing plate 52 towards the steering wheel shaft 30. The center of the plate 52 then coincides with the center 54 of the stub axle 56. Meanwhile, the slopes 80 are placed outside the zone covered by the control cam 32 when the steering wheel shaft 30 is rotated about the axis 34. As a result, rotation of the steering wheel shaft has no effect on the reversing plate 52 or on the switch.

When the control lever 10 is pivoted about the axis 12 in one direction (for example anti-clockwise) the reversing plate 52 is moved in the opposite direction (for example clockwise) by virtue of the co-operation between the drive stud 14 and the cut-out 70. Simultaneously, the drive stud 14 moves along the cut-out 70 towards the periphery of the reversing plate 52, as shown in FIG. 2.

The plane of symmetry 81 of the reversing plate 52 is then inclined at an angle ε relative to the plane containing the axes 12, 54, and 34.

One of the groups of slopes 82 or 85 of slope 80 thus penetrates into the zone through which the control cam 32 moves.

When the steering wheel shaft is rotated in a direction corresponding to the direction in which the control lever 10 has been pivoted (anti-clockwise as shown in FIG. 2), one of the flanks 33 or 31 of the control cam 32 bears against one of the secondary slopes 83 or 86. These slopes 83 and 86 are oriented substantially transversely to the long direction of the slot 58 and of the cut-out 70. The control cam 32 then exerts a force on the reversing plate 52 suitable for maintaining the reversing plate in its working position, together with a component which is parallel to the long direction of the slot 58 and the cut-out 70. As a result, the reversing plate 52 moves radially relative to the axis 54 away from the steering wheel column 30 against the urging of the spring 90, as shown in FIG. 3. Simultaneously, the drive stud 14 moves along the cut-out 70. In this position, the slopes 80 lie outside the zone of control cam displacement.

The steering wheel shaft 30 may then continue to rotate. When the control cam 32 escapes from the above-mentioned slope 83 or 86, the reversing plate 52 is returned to its initial working position by the spring 90 as shown in FIG. 2.

However, when the steering wheel shaft 30 is rotated in the direction opposite to the inclination of the control lever 10 (i.e. clockwise as shown in FIG. 2), the control cam 32 engages one of the main slopes 84 or 87 in order to exert a return force thereon tending to return the reversing plate 52 and the control lever 10 to their rest positions, by pivoting them about their respective axes 12 and 54 (i.e. towards the position shown in FIG. 1).

It may be observed that the position shown in FIG. 3 may also be obtained when the switch is moved to a working position while the control cam 32 is randomly disposed facing the slopes 80, or else while the driver manually holds the control lever 10 in the working position while the control cam 32 is tending to urge the reversing plate to its rest position.

In this latter case, the position shown in FIG. 3 corresponds to a forcing position. It is obtained when one of the flanks 31 and 33 of the control cam engages one of the main slopes 84 or 87. The authorized radial displacement of the reversing plate 52 relative to the axis 54 makes it possible to hold the switch in the working position in order to switch on a change-of-direction indicator.

Naturally, the present invention is not limited to the particular embodiment described above, but extends to any variant falling within the spirit thereof.

Thus, where appropriate, the drive structures linking the control lever 10 and the reversing plate 52 could be formed, not by a stud fixed to the lever 10 and engaged in a cut-out provided in the reversing plate, but by an oblong cut-out provided in the control lever 10 receiving a drive stud fixed to the reversing plate 52.

Similarly, the guidance of the reversing plate 52 on the support 1 in rotation and in radial displacement relative to the axis 54 could be obtained, not by means of a stub axle fixed to the support 1 and engaged in an oblong slot provided in the plate 52, but by means of a stub axle fixed to the plate 52 and engaged in an oblong slot provided in the support 1.

Further, where appropriate, the slopes 80 including the above-mentioned surfaces 83, 84, 86, and 87 on the reversing plate 52 in the example illustrated, could be provided on a separate component carried by the reversing plate 52 in order to follow it when it pivots by rotation about the axis 54, while allowing the slope-carrying component to move radially away from the control cam and relative to the pivot axis of the reversing plate against a resilient force exerted by a spring associated with the reversing plate, in order to enable the device to move into the forcing position. In this case, the reversing plate 52 would be guided strictly in rotation about the axis 54 and would not be provided with the possibility of moving radially relative thereto.

It should also be observed that the control lever pivot axis 12 could be disposed transversely to the pivot axis 54 of the reversing plate 52.

Figure 4:
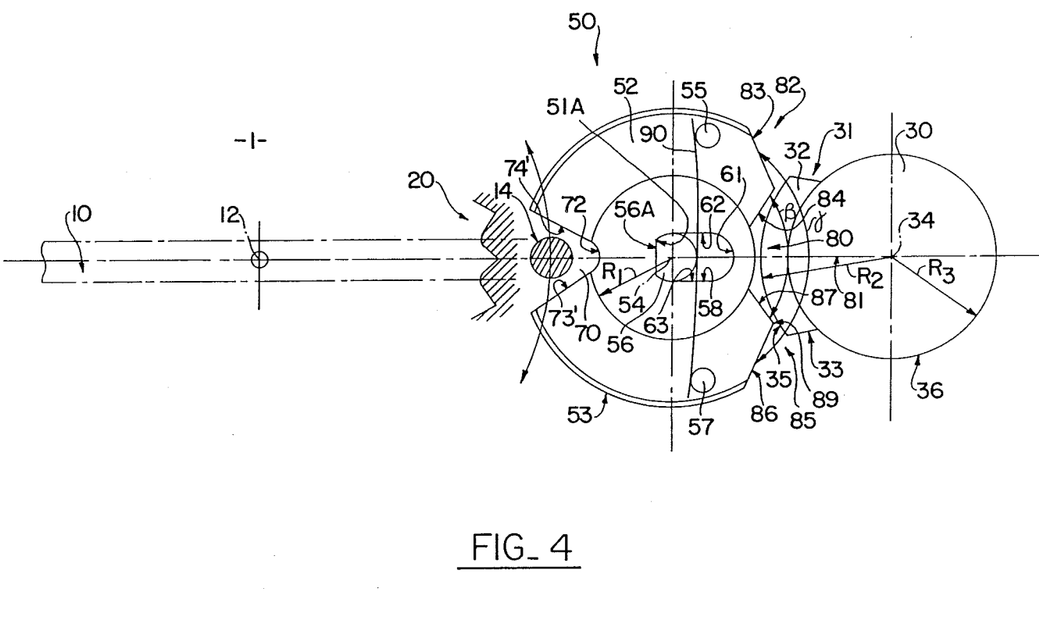
FIG. 4 shows a variant including provision for lost motion.
Figure 5:
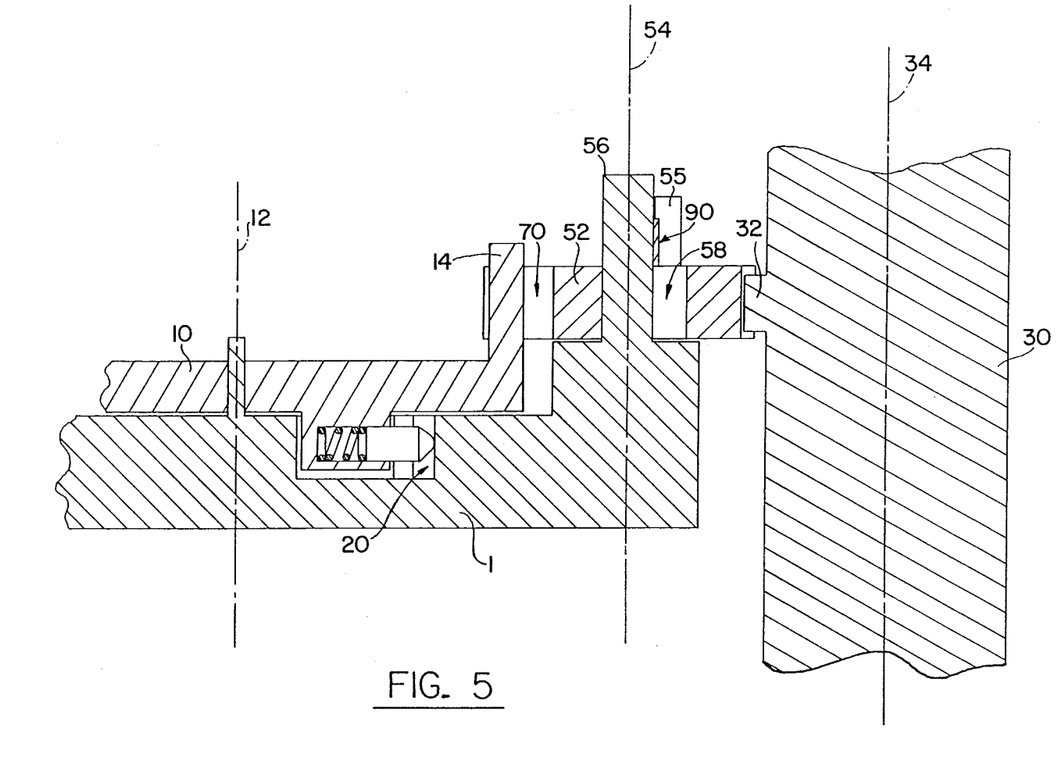
FIG. 5 shows a transverse view of the control means of FIG. 1.

The drive structures 70 and 14 defining a drive linkage between the lever 10 and the reversing plate 52 may include lost motion. This can be provided by the diameter of the stud 14 being less than the distance between the plane surfaces 73 and 74, or by providing such surfaces which are not parallel, as shown in FIG. 4. This makes it possible to move the control lever 10 through different angles without changing the structure of the means described above and shown in the accompanying figures.

However, in order to maintain indexing of the reversing plate 52 when the control lever 10 is in the rest position, it is advantageous to use a stub axle 56 which is non-cylindrical and which co-operates with a corresponding surface in the slot 58. More precisely, the stub axle 56 may have a flat 56A extending perpendicularly to the plane containing the axes 12, 54, and 34, and directed towards the lever 10, with the slot 58 having a complementary flat 51A instead of the above-mentioned semi-cylindrical end surface 60, with said flat 51A extending perpendicularly to the plane of symmetry 81.

I claim:

1. An electric switch cooperating with a steering wheel shaft provided with a control cam for controlling change of direction indicators of a motor vehicle, including:
   a support casing;
   a control lever pivotally mounted on said support casing about a first pivot axis;
   a reversing plate pivotally mounted on said support about a second axis which is parallel to said first pivot axis, said reversing plate facing said control cam provided on the steering wheel shaft and being able to move relative to the second axis away from the control cam;
   drive structures provided on said reversing plate for cooperating with the lever so that the reversing plate is pivoted about said second axis into a working position, in response to the control lever itself being pivoted about said first axis into a working position;
   said reversing plate including slopes so that the slopes interfere with the rotary path of the control cam when the reversing plate is in the working position;
   a spring resiliently urging said reversing plate towards the steering wheel shaft;
   an indexing notched surface provided on said support casing, and
   an indexing stud provided on said lever, said stud being resiliently urged against said notched surface.

2. An electric switch according to claim 1 wherein said drive structures comprise:
   an oblong cut-out extending radially relative to one of said axis in one of said lever and said reversing plate, and
   a drive stud provided on the other of the said lever and said reversing plate, said stud being engaged in said oblong cut-out.

3. An electric switch according to claim 2, wherein the cut-out is provided in the reversing plate and the drive stud is fixed to the control lever.

4. An electric switch according to claim 1, wherein said first pivot axis, said second axis and a pivot axis of said steering wheel shaft are in the same plane.

5. An electric switch according to claim 1, wherein the reversing plate is guided on the support by means of an oblong slot extending radially relative to the pivot axis of the reversing plate and by a stub axle engaged in the slot.

6. An electric switch according to claim 5, wherein the slot is provided in the reversing plate, and the stub axle is fixed to the support.

7. An electric switch according to claim 1, wherein the spring is in the form of a spring blade.

8. An electric switch according to claim 1, wherein the slopes comprise two groups of slopes disposed symmetrically about a plane which coincides, in a rest position, with the plane containing the pivot axis of the control lever, the pivot axis of the reversing plate, and an axis of the steering wheel shaft.

9. An electric switch according to claim 8, wherein each of the two groups of slopes comprises two surfaces.

10. An electric switch according to claim 8, wherein each of the two groups of slopes includes a main surface directed towards the plane of symmetry and oriented substantially along a bisector of the angle formed between a radius running from the pivot axis of the reversing plate and a normal to the plane of symmetry.

11. An electric switch according to claim 8, wherein each of the two groups of slopes includes a secondary surface oriented substantially along a normal to the plane of symmetry.

12. An electric switch according to claim 1, wherein the drive structures define a drive link between the lever and the reversing plate including lost motion.

13. An electric switch cooperating with a steering wheel shaft provided with a control cam for controlling change of direction indicators of a motor vehicle, including:
   a support casing;
   an indexing notched surface provided on said support casing;
   a control lever pivotally mounted on said support casing about a first pivot axis;
   a reversing plate facing said control cam provided on the steering wheel shaft, said reversing plate being pivotally mounted on said support casing about a second axis which is parallel to said first pivot axis, and being able to move relative to the second axis away from the control cam;
   drive structures comprising an oblong cut-out extending in one of said lever and said reversing plate, and
   a drive stud, said drive stud extending substantially parallel to said first pivot axis on the other of said lever and said reversing plate, said stud being engaged in said oblong cut-out so that said reversing plate is pivoted about said second axis into a working position in response to the control lever itself pivoted about said first axis into a working position;
   said reversing plate including slopes so that the slopes interfere with the rotary path of the control cam when said reversing plate is pivoted by said control lever about said second axis into the working position;
   a spring resiliently urging said reversing plate towards the steering wheel shaft, and
   an indexing stud provided on said lever, said stud being resiliently urged against said notched surface.

14. An electric switch cooperating with a steering wheel shaft provided with a control cam for controlling change of direction indicators of a motor vehicle, including:
   a support casing;

an indexing notched surface provided on said support casing;

a control lever pivotally mounted on said support casing about a first pivot axis;

a reversing plate facing said control cam provided on the steering wheel shaft;

an oblong slot extending in one of the support casing and the reversing plate;

a stud axle provided on the other of said support casing and reversing plate and which stud axle is engaged in said oblong slot so that said reversing plate is pivotally mounted on said support casing about a second axis which is parallel to said first pivot axis and is able to move relative to the second axis away from the control cam;

drive structures comprising an oblong cut-out extending in one of said lever and said reversing plate;

a drive stud which extends substantially parallel to said first pivot axis, said stud being located on the other of said lever and said reversing plate, said stud being engaged in said oblong cut-out so that said reversing plate is pivoted about said second axis into a working position in response to the control lever being pivoted about said first axis into a working position;

said reversing plate including slopes so that the slopes interfere with the rotary path of the control cam when said reversing plate is pivoted by said control lever about said second axis into the working position;

a spring resiliently urging said reversing plate towards the steering wheel shaft, and an indexing stud provided on said lever, said indexing stud being resiliently urged against said notched surface.

15. An electric switch cooperating with a steering wheel shaft provided with a control cam for controlling change of direction indicators of a motor vehicle, including:

a support casing;

an indexing notched surface provided on said support casing;

a control lever pivotally mounted on said support casing about a first pivot axis;

a reversing plate, said plate facing said control cam provided on the steering wheel shaft;

an oblong slot extending in one of the support casing and the reversing plate;

a stud axle provided on the other of said support casing and reversing plate and which stud axle is engaged in said oblong slot so that said reversing plate is pivotally mounted on said support casing about a second axis which is parallel to said first pivot axis to enable said reversing plate to move relative to the second axis away from the control cam;

drive structures comprising an oblong cut-out extending in one of said lever and said reversing plate, and a drive stud which extends substantially parallel to said first pivot axis, said stud being located on the other of said lever and said reversing plate, said stud being engaged in said oblong cut-out, said drive stud having a diameter which is less than the width of said oblong cut-out so that said reversing plate is pivoted about said second axis with lost motion into a working position when the control lever is itself pivoted about said first axis into a working position;

said reversing plate including slopes so that the slopes interfere with the rotary path of the control cam when said reversing plate is pivoted by said control lever about said second axis into the working position, said slopes comprising two groups of slopes disposed symmetrically about a plane which coincides, in a rest position, with the plane containing the pivot axis of the control lever, the pivot axis of the reversing plate, and an axis of the steering wheel shaft, each group of slopes comprising a main surface and a secondary surface wherein the main surface is directed towards the plane of symmetry and oriented substantially along a bisector of the angle formed between a radius running from the pivot axis of the reversing plate and a normal to the plane of symmetry, and the secondary surface is oriented substantially along a normal to the plane of symmetry.

16. An electric switch according to claim 15 wherein the stud axle has a flat surface extending perpendicularly to the plane containing the pivot axis of the reversing plate and the axis of the steering wheel shaft, and the oblong slot has a complementary flat surface.

* * * * *